(12) United States Patent
Yue et al.

(10) Patent No.: US 7,660,360 B2
(45) Date of Patent: Feb. 9, 2010

(54) PEAK-TO-AVERAGE POWER RATIO REDUCTION WITH THRESHOLD LIMITED SELECTION FOR CODED OFDM SYSTEMS

(75) Inventors: Guosen Yue, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 547 days.

(21) Appl. No.: 11/536,263

(22) Filed: Sep. 28, 2006

(65) Prior Publication Data
US 2007/0098094 A1 May 3, 2007

Related U.S. Application Data

(60) Provisional application No. 60/732,846, filed on Nov. 2, 2005.

(51) Int. Cl.
*H04K 1/10* (2006.01)
*H04L 27/28* (2006.01)
(52) U.S. Cl. .................. 375/260; 375/295; 370/206
(58) Field of Classification Search ......... 375/259–260, 375/285, 295–297; 370/206
See application file for complete search history.

(56) References Cited

U.S. PATENT DOCUMENTS 6,950,389 B2 * 9/2005 Weerackody ............... 370/210

2002/0150036 A1 * 10/2002 Weerackody ............... 370/208
2004/0136314 A1 * 7/2004 Jung et al. .................. 370/203
2006/0098747 A1 * 5/2006 Yue et al. ................... 375/260

OTHER PUBLICATIONS

R. J. Baxley, et al., "Ordered Phase Sequence Testing in SLM for Improved Blind Detection", Proc. of IEEE Workshop on Sig. Proc. Advances in Wireless Commun. (SPAWC), New York, NY, Jun. 2005.
"Overview of PAPR Reduction Coding Techniques for OFDM", Downloaded from www.ece.utexas.edu/wncg/ee381v/student_report/par_zuniga.doc on Sep. 27, 2006.
T.T. Nguyen, et al., "On Partial Transmit Sequences for PAR Reduction in OFDM Systems", Downloaded from www.ece.ubc.ca/~lampe/Preprints/PAR.pdf on Sep. 27, 2006.

* cited by examiner

*Primary Examiner*—Jean B Corrielus
(74) *Attorney, Agent, or Firm*—James J. Bitetto

(57) ABSTRACT

Disclosed is a coded orthogonal frequency-division multiplexing (OFDM) system and method for reducing a peak-to-average power ratio (PAPR). The system and method include a modulator configured to modulate (e.g., using quadrature amplitude modulation (QAM)) coded bits into symbols. The system and method also include an inverse discrete fourier transform (IDFT) module to perform an IDFT on the symbols to produce an OFDM signal. The system and method measure the PAPR of the OFDM signal and transmit the signal to a receiver if the PAPR of the signal is less than a threshold PAPR.

21 Claims, 8 Drawing Sheets

PEAK-TO-AVERAGE POWER RATIO REDUCTION WITH THRESHOLD LIMITED SELECTION FOR CODED OFDM SYSTEMS

This application claims the benefit of U.S. Provisional Application No. 60/732,846 filed Nov. 2, 2005, which is incorporated herein by reference.

BACKGROUND OF THE INVENTION

The present invention relates generally to coded orthogonal frequency-division multiplexing (OFDM) systems, and more particularly to reducing the peak-to-average power ratio (PAPR) in coded OFDM systems.

Orthogonal frequency-division multiplexing (OFDM) has traditionally been robust against multipath fading channels and may be used for effective high-speed wireless data transmission.

One drawback of OFDM systems, however, is that an OFDM signal typically exhibits a high peak-to-average power ratio (PAPR). Such a high PAPR occurs when symbols that create the OFDM signal multiplied with the Inverse Discrete Fourier Transform (IDFT) add constructively.

A high PAPR often necessitates the use of a linear amplifier with large dynamic range (the range in which the amplifier has linear amplifying property). A linear amplifier having a large dynamic range is often difficult to design. An amplifier with nonlinear characteristics (i.e., outside of the linear operation range), however, can cause undesired distortion of the in-band and out-of-band signals.

A number of approaches have been proposed to suppress the PAPRs in OFDM systems. These approaches may be grouped into different categories or techniques. One technique to suppress the PAPRs in OFDM systems is by using block coding (i.e., to transmit codewords having low PAPR). Such coding techniques typically provide acceptable PAPR reduction and coding gain. A problem associated with the coding approach is that, for an OFDM system with a large number of subcarriers, either the system encounters design difficulties or the coding rate becomes prohibitively low.

The second type of approach is through clipping and filtering of OFDM signals. Clipping can reduce PAPR, but may introduce in-band clipping noise and filtering. Filtering is employed to remove side-lobes generated by clipping, but filtering may also generate additional PAPR.

The third type of approach is phase rotation including selective mapping (SLM) and partial transmit sequence (PTS). A PAPR reduction scheme may use advanced codes, such as turbo codes, low-density parity-check (LDPC) codes, or repeat accumulate (RA) codes to achieve SLM. These codes not only offer high error correction performance, but a random interleaver in an encoder also provides different random coded sequences for SLM using several label bits before encoding. The sequence is a sequence of coded bits after the encoding, i.e., a codeword. With different settings of the label bits, different codewords are obtained (i.e., different sequences of the coded bits). However, a disadvantage of the conventional SLM or PTS technique is that one or more iterative gradient algorithms may need to be applied to reduce the complexity of searching for the optimal sequence over candidate sequences.

There is no such gradient methods for complexity reduction in a coded scrambling method (e.g., described above using the different label-bits to obtain different coded sequences). Instead, a selector usually has to exhaustively travel through all of the sequences obtained from the different combinations of label bits.

Therefore, there remains a need to more effectively reduce the PAPR of an OFDM system.

SUMMARY OF THE INVENTION

In accordance with an embodiment of the present invention, a coded orthogonal frequency-division multiplexing (OFDM) system and method for reducing a peak-to-average power ratio (PAPR) includes a modulator configured to modulate (e.g., using quadrature amplitude modulation (QAM)) coded bits into symbols. An inverse discrete fourier transform (IDFT) module performs an IDFT on the symbols to produce an OFDM signal. The system and method measure the PAPR of the OFDM signal and transmit the OFDM signal to a receiver if the PAPR of the OFDM signal is less than a threshold PAPR.

The OFDM system may also include a label inserter configured to mix information bits with corresponding label bits. These information bits can then be encoded by an encoder with the corresponding label bits with random-like codes to produce the coded bits. The encoder may be an LDPC generator matrix.

These and other advantages of the invention will be apparent to those of ordinary skill in the art by reference to the following detailed description and the accompanying drawings.

DETAILED DESCRIPTION

Figure 1:
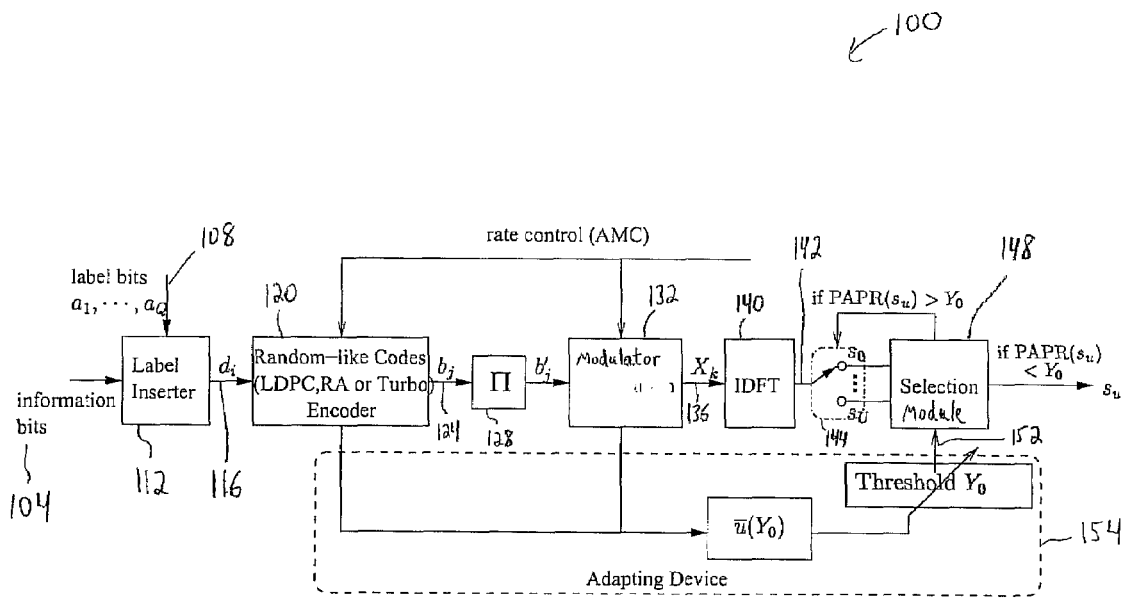
FIG. 1 is a block diagram of a coded OFDM system in accordance with an embodiment of the present invention.

FIG. 1 shows a coded OFDM system 100 with K subcarriers (in OFDM systems, the frequency spectrum is divided into subbands. The smallest subband is called a subcarrier) signaling through a quasi-static fading channel. The OFDM system 100 is a transmitter used in mobile communications with a receiver. Each signal frame contains the information to be transmitted to a receiver in one OFDM slot.

Information bits 104 are transmitted (i.e., mixed) with label bits $a_1, \ldots, a_Q$ 108 into a label inserter 112 to produce label inserted information bits $d_i$ 116. The label inserted information bits $d_i$ 116 of each signal frame are encoded by a channel encoder 120, e.g., LDPC or RA encoder 120, to produce coded bits $b_j$ 124. The coded bits $b_j$ 124 are then interleaved by interleaver 128 and mapped into quadrature amplitude modulation (QAM) symbols $X_0, \ldots, X_{K-1}$ by modulator 132, where $X_k$ 136 represents the symbol at the kth subcarrier. An inverse discrete Fourier transform (IDFT) is then performed on each symbol 136 by an IDFT block 140 to produce an OFDM signal $s_u$ 142, where u denotes the decimal value of the binary sequence $a_1, a_2, \ldots, a_Q$, also referred to as a sequence. A selection module 148 is used to automatically select a threshold $Y_0$ 152. The threshold $Y_0$ 152 represents a maximum PAPR that an OFDM signal can have in order to transmit the OFDM signal to the receiver. A selector 144 then measures the PAPR of the OFDM signal $s_u$ 142 to determine whether its PAPR is less than the threshold $Y_0$ 152. If so, then the selector 144 (which may or may not include the selection module 148) transmits the OFDM signal $s_u$ 142 to the receiver. The OFDM system 100 also includes an adapting device 154. The adapting device 154 can adjust the threshold $Y_0$ 152.

PAPR Definition

After IDFT, the resulting complex baseband OFDM signal is given by $$s(t) = \frac{1}{\sqrt{K}} \sum_{k=0}^{K-1} X_k e^{j2\pi kt/K}, \quad 0 \le t < T, \quad (1)$$

where T is the duration of one OFDM signal slot and K is the number of subcarriers. At the receiver, assuming proper cyclic extension and ideal sampling, the signal model after DFT is given by $$Y_k = H_k X_k + \eta_k, \quad (2)$$

where $H_k$ is the channel response of the kth subcarrier and $\eta_k$ is the additive white Gaussian noise, i.e., $\eta_k \sim N_C(0, \sigma_{\eta_k}^2)$ (where $N_C$ denotes complex Gaussian distribution, $N_C(0, \sigma_{\eta_k}^2)$ is the complex Gaussian distribution with zero mean and variance $\sigma_{\eta_k}^2$. "$\eta_k \sim N_C(0, \sigma_{\eta_k}^2)$" indicates that random complex variable $\eta_k$ follows the complex Gaussian distribution with zero mean and variance $\sigma_{\eta_k}^2$). The PAPR of the OFDM signal is defined as $$PAPR \triangleq \frac{\max_{0 \le t < T} |s(t)|^2}{E\{|s(t)|^2\}} \quad (3)$$

where E denotes the expectation and s(t) denotes the continuous OFDM signal).

An oversampling on the OFDM signal is needed to accurately preserve a discrete PAPR. Considering oversampling by a factor of J, the resulting discrete OFDM signal is given by $$s_n = \frac{1}{\sqrt{K}} \sum_{k=0}^{K-1} X_k e^{j2\pi kn/JK}, \quad n = 0, \ldots, JK - 1. \quad (4)$$

Thus, the PAPR of the discrete OFDM signal is given by $$PAPR = \frac{\max_{0 \le n < JK} |s_n|^2}{\frac{1}{JK} \sum_{n=0}^{JK-1} |s_n|^2} \quad (5)$$

PAPR Reduction Scheme

Conventional Selected Mapping

Selected mapping (SLM) is a PAPR suppression method for OFDM signals. It employs random phase rotation to generate a number of sequences of rotated OFDM data symbols. The symbol with the lowest PAPR is selected for transmission. U distinct phase rotation vectors, $p^{(u)} = [e^{j\Phi_0^{(u)}}, \ldots, e^{j\Phi_{K-1}^{(u)}}]$, u=1, . . . , U. Each block of OFDM symbols is multiplied carrierwise with U vectors, resulting in a set of U different sequences with each entry being $$X_k^{(u)} = X_k e^{j\Phi_k^{(u)}}, k=0, \ldots, K-1.$$

Then, all U sequences are transformed into the time domain and the one with the lowest PAPR is selected for transmission.

Selected Mapping with Random-Like Codes

A PAPR reduction scheme can be implemented via selected mapping using a label inserted random-like encoder. The random-like codes offer capacity-achieving performance largely due to the random interleaver of the codes. The inherent random interleaver in the random-like codes can be used as a scrambler to obtain candidates of independent data sequences. FIG. 1 shows a block of L-Q information bits 104 being inserted with (i.e., mixed with) Q label bits 108, then encoded by a rate of R=L/N random-like codes, i.e., turbo code, LDPC code, or RA code. If using a systematic code (i.e., coded bits that contain the information bits), another interleaver may be added to mix the information bits with parity bits randomly. For non-systematic code (i.e., the information bits are not in the sequence of coded bits), the previously mentioned additional interleaver can be omitted.

Figure 2A:
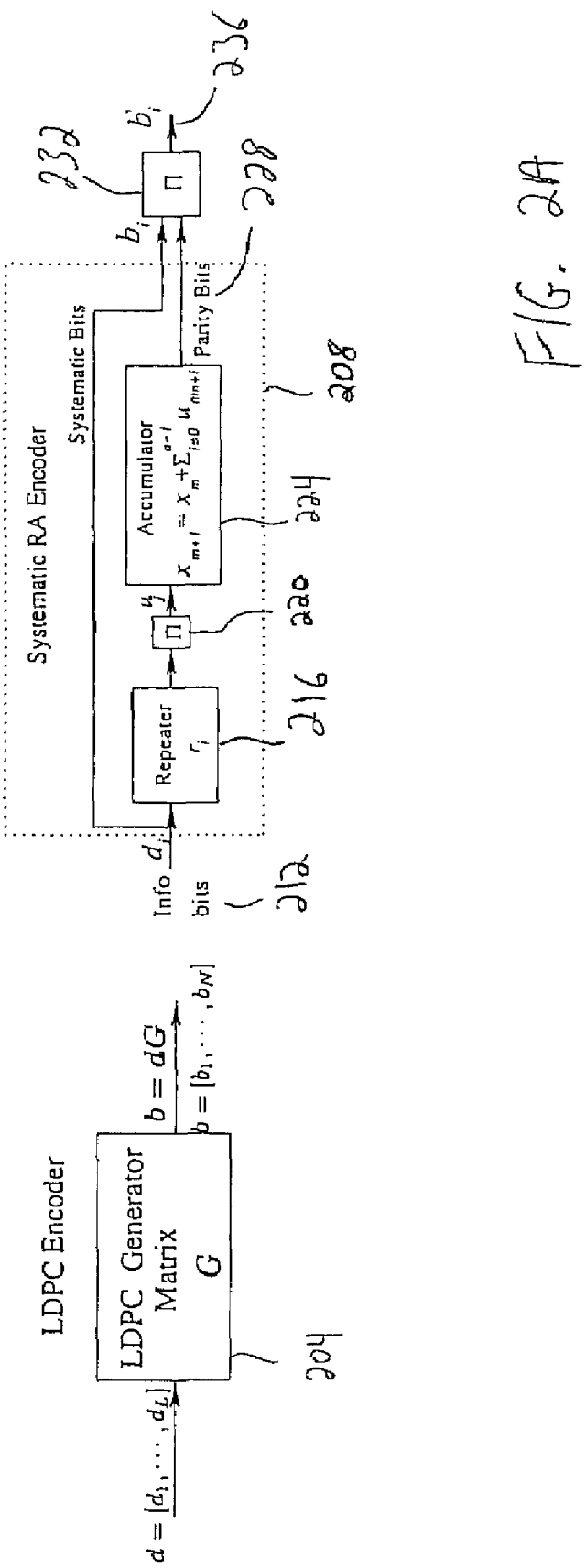
FIG. 2A is a block diagram of a LDPC encoder and a systematic repeat accumulate encoder in accordance with an embodiment of the present invention.

FIG. 2A shows the schematic plot of an LDPC encoder 204 and a systematic RA encoder 208. Coded bits are modulated using QAM constellation into a block of $K=N/M_c$ symbols $X_k$, k=0, . . . , K-1 assigned to K· subcarriers, where $M_c$ is the number of bits per symbol, i.e., $\log_2$ {constellation size}. IDFT is then applied to the modulated symbols. With oversampling, the PAPR of the discrete OFDM signal is measured. By enumerating the possible sequences of inserted label bits before the encoding, different PAPR values are obtained. The selector selects the one corresponding to the lowest PAPR to transmit.

Because of the recursive convolutional code components in turbo codes and RA codes, or the dense generator matrix in LDPC codes, as shown in FIG. 2, each information bit can affect almost all of the coded bits for non-systematic codes or N(1−R) parity bits in the systematic coded bits. The non-systematic codes may have a better scrambling effect.

The systematic codes may still offer good randomization by employing the interleaver before modulation if the code rate R is equal to or less than ½. Thus, the label-inserted encoding still has good PAPR reduction by the selected mapping for systematic codes. The label bits can be placed at any positions. They can be placed either randomly, or placed together at the beginning of the information bit block, as long as the positions are predetermined and known to the receiver. Because the label bits are inserted before encoding, no side information needs to be transmitted to the receiver. The received sequence can be decoded and the label bits can be discarded.

FIG. 2A also shows a systematic RA encoder 208. Information bits 212 are transmitted to a repeater 216. The repeater 216 repeats the bits and then transmits the bits to an interleaver 220. The interleaver 220 permutes the output of the repeater 216 and transmits the permuted results to an accumulator 224. The accumulator 224 produces parity bits 228 which are then transmitted to another interleaver 232. The interleaver 232 also receives the information bits 212, and produces coded bits 236.

PAPR Reduction Performance of SLM

Denote $F(\cdot)$ as the cumulative distribution function (CDF) of the discrete OFDM signal $s_n$, i.e., $F(Y)=Pr(PAPR<Y)$. Then, under the above selective mapping scheme and based on the order statistics, the complementary CDF (CCDF) of PAPR is:

$$Pr(PAPR_{SLM} > Y) = Pr(\min(PAPR_1, \ldots, PAPR_U) < Y) \quad (6)$$
$$= (Pr(PAPR > Y))^U$$
$$= (1 - F(Y))^U,$$

where U is the number of candidate sequences, i.e., $U=2^Q$ for Q label bits. Assuming $s_n$ is Nyquist-rate sampled complex Gaussian sequences with unit variance, the CDF of PAPR is then given by $$F(Y)=Pr(PAPR<Y)=(1-e^{-Y})^K \quad (7)$$

So the CCDF of PAPR after SLM is given by $$Pr(PAPR_{SLM}>Y)=(1-(1-e^{-Y})^K)^U \quad (8)$$

Above CCDF of PAPR for selected mapping is based on PAPR distribution of the Nyquist-rate sampled OFDM signal. A simplified asymptotic form of distribution for high Y based on the level-crossing (LC) approximation is then given by:

$$F(Y) \approx Pr(PAPR < Y) \approx \exp\left[-\sqrt{\frac{\pi}{3}} K\sqrt{Y} e^{-Y}\right] \quad (9)$$

The other approximated expression for the CDF of PAPR of the OFDM signal is based on the extreme value theory (EVT):

$$F(Y) \approx \exp\left[-K\sqrt{\frac{\pi}{3}\log K} \, e^{-Y}\right]. \quad (10)$$

Both expressions in (9) and (10) are close to the PAPR CDF of the oversampled OFDM signals. The CCDF of PAPR after SLM from expression (6) is then given by:

$$Pr(PAPR_{SLM} > Y) \approx \begin{cases} \left(1 - e^{-\sqrt{\frac{\pi}{3}} K\sqrt{Y} e^{-Y}}\right)^U, & \text{level crossing,} \\ \left(1 - e^{-K\sqrt{\frac{\pi}{3}\log K} \, e^{-Y}}\right)^U, & \text{EVT.} \end{cases} \quad (11)$$

Figure 2B:
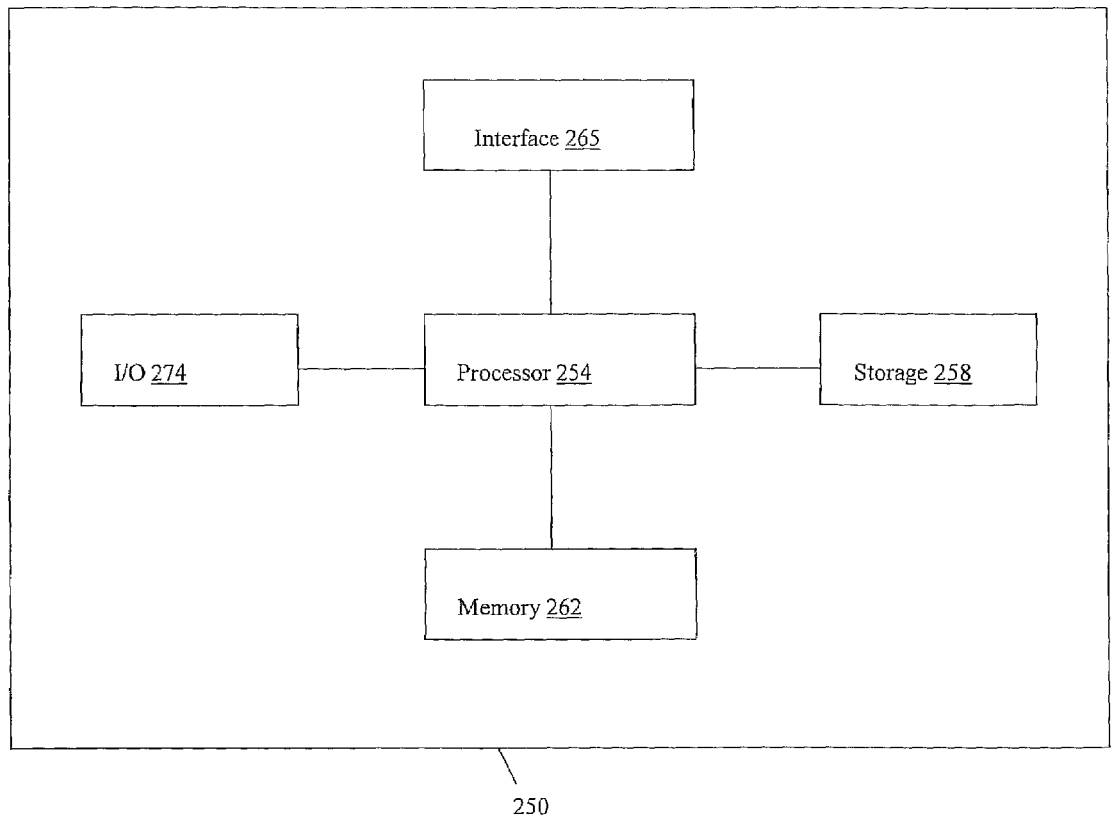
FIG. 2B shows a high level block diagram of a computer system which may be used in an embodiment of the invention.

The description above and below describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other modules. A high level block diagram of such a computer is shown in FIG. 2B. Computer 250 contains a processor 254 which controls the overall operation of computer 250 by executing computer program instructions which define such operation. The computer program instructions may be stored in a storage device 258 (e.g., magnetic disk) and loaded into memory 262 when execution of the computer program instructions is desired. Computer 250 also includes one or more interfaces 265 for communicating with other devices (e.g., locally or via a network). Computer 250 also includes input/output 274 which represents devices which allow for user interaction with the computer 250 (e.g., display, keyboard, mouse, speakers, buttons, etc.). The computer 250 may represent any of the components shown in FIG. 1 (e.g., the selector 144) or the system 100 of FIG. 1.

One skilled in the art will recognize that an implementation of an actual computer will contain other elements as well, and that FIG. 2B is a high level representation of some of the elements of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

Figure 2C:
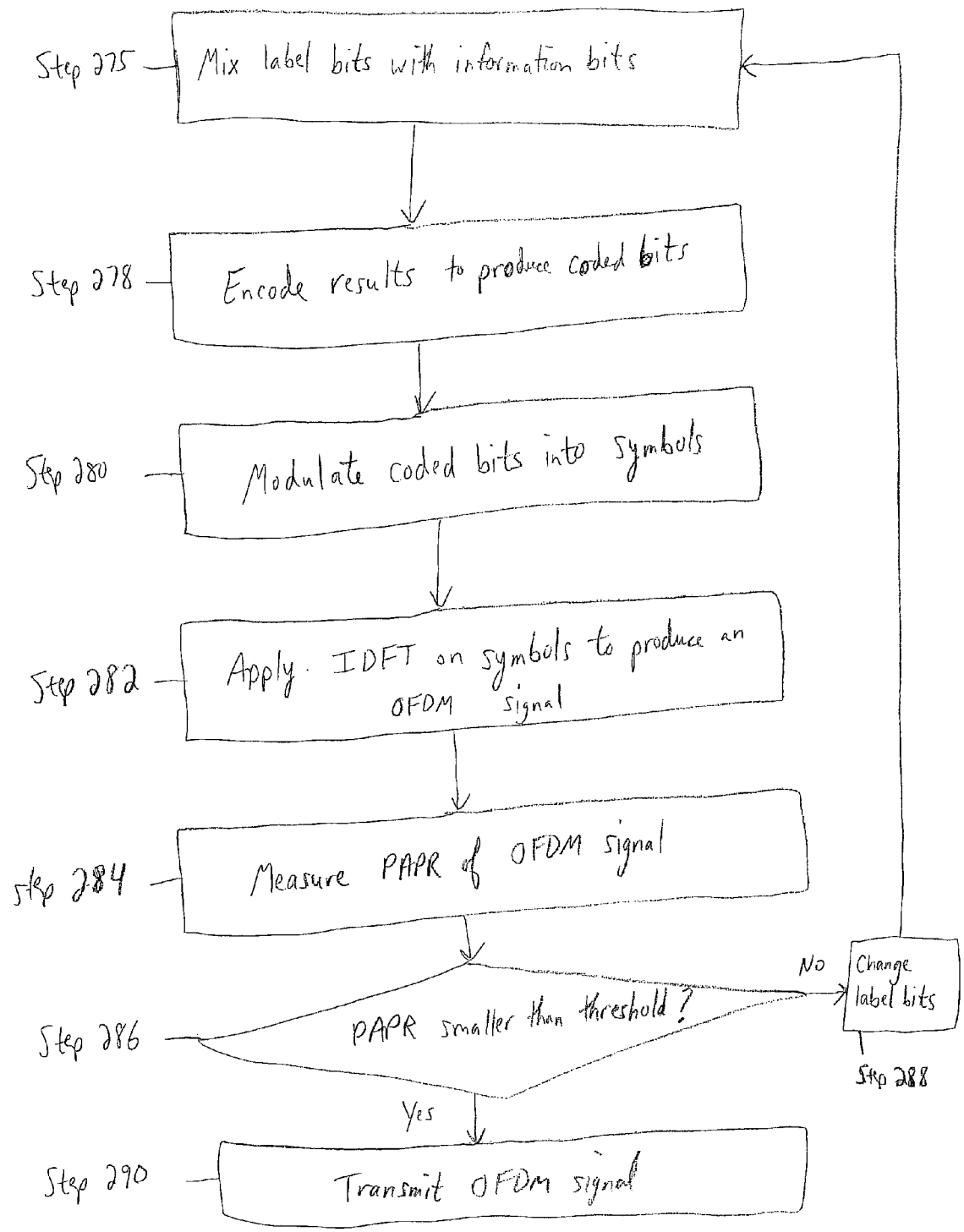
FIG. 2C is a flowchart showing the steps performed by the OFDM system of FIG. 1 in accordance with an embodiment of the invention.

FIG. 2C is a flowchart showing an embodiment of the steps performed by the OFDM system 100 of FIG. 1. The OFDM system receives information bits and mixes the information bits with label bits in step 275. The OFDM system then encodes the results of step 275 to produce coded bits in step 278. The system then modulates the coded bits into symbols in step 280. This modulation may be, as described, QAM modulation. The system then applies an inverse discrete Fourier transform (IDFT) on the symbols to produce an OFDM signal in step 282. The system then measures the PAPR of the OFDM signal in step 284. If the PAPR is not less than (or equal to) a predetermined threshold PAPR (step 286), the system changes the label bits $a_1, \ldots, a_Q$ 108 in step 288 and returns to step 275 for additional processing. If, however, the PAPR of the OFDM signal is less than (or equal to) the threshold PAPR, then the system transmits the OFDM signal to the receiver in step 290.

Figure 3:
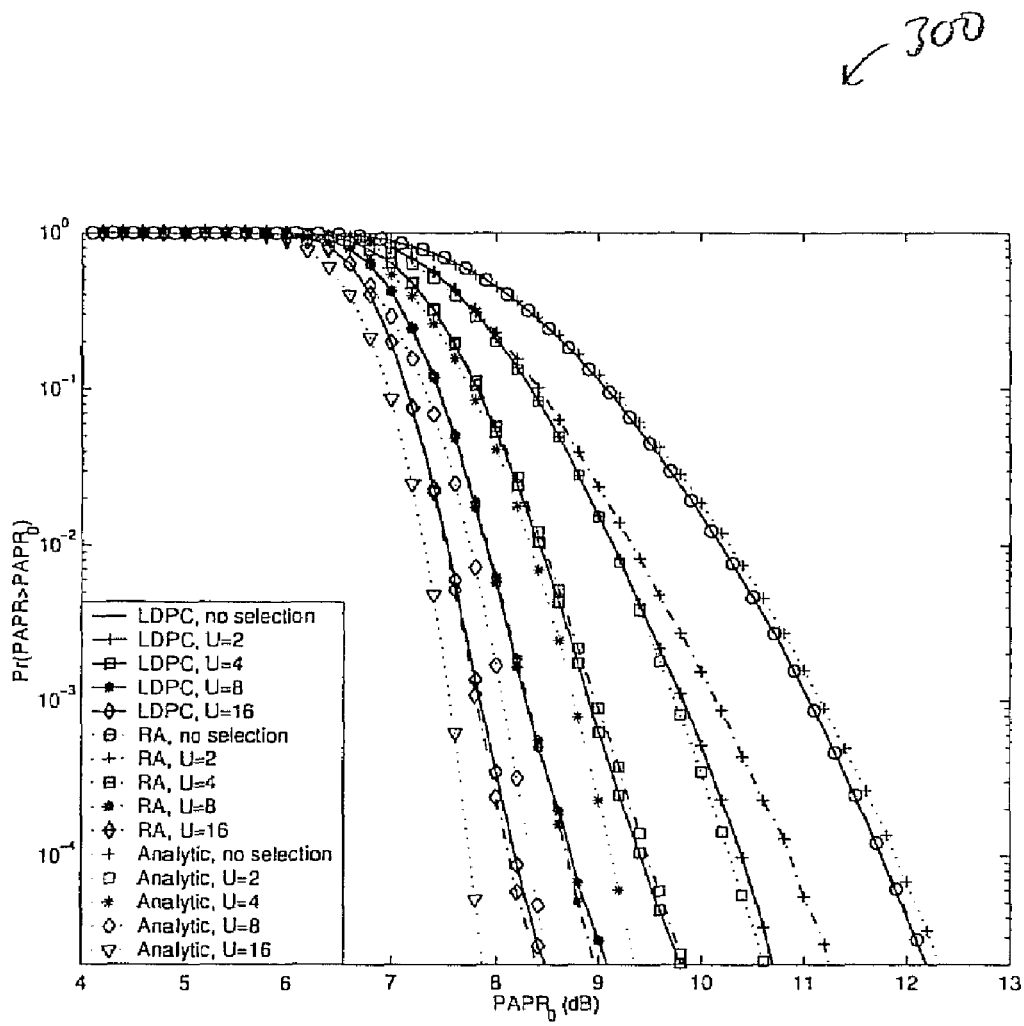
FIG. 3 is a graphical representation of PAPR reduction using a label inserted encoder as SLM with a number of subcarriers, K, and Quadrature Phase Shift Keying (QPSK) modulation in accordance with an embodiment of the present invention.

FIG. 3 shows CCDF curves 300 of the PAPR results using label inserted encoder as SLM. In one embodiment, the number of subcarriers is K=128 and Quadrature Phase Shift Keying (QPSK) modulation is used. The number of inserted label bits may go up to 4, i.e., Q=1, 2, 3, 4. The corresponding number of selections may be U=2, 4, 8, 16, respectively. In one embodiment, two types of rate-1/2 codes are considered, namely, a non-systematic LDPC code and a systematic RA code with profile ($\lambda_5=1$, a=5). The RA ensemble can be represented by degree profiles of repetitions, $\lambda_i$, and group factor a in the accumulator 224, where $\lambda_i$ represents the proportion of the edges connected to the information bit nodes with degree i. The analytical result in equation (11) above from level crossing method is also included. Without using selected mapping, the $PAPR_0$ of the original OFDM signal at $Pr(PAPR>PAPR_0=Y)=10^{-4}$ is approximately 11.75 dB. With Q=1, 2, 3, 4, the suppressed PAPRs at $Pr(PAPR>Y)=10^{-4}$ are 1.3, 2.3, 3.1, and 3.6 dB, respectively, using the LDPC encoder 204, and 1.0, 2.3, 3.1, and 3.7 dB, respectively, using the RA encoder 208. Both LDPC codes and RA codes can perform close to analytical results of SLM with random sequences.

Threshold Limited Selection

The conventional SLM typically uses complex sequences to form U candidate sequences. Then the index of the selected sequence is transmitted to the receiver using $\log_2 U$ bits. In one embodiment, comparing conventional SLM using random or quantized sequences, the encoding aided SLM scheme does not require the transmission of the label bit sequence. Therefore, there is no potential performance loss caused by the detection failure of the side information.

In the SLM method, the PAPRs are evaluated from the candidate sequences, and then the candidate sequence with the lowest PAPR is selected to be transmitted. Thus, the complexity of the exhaustive search to obtain the optimal solution increases exponentially. For conventional SLM schemes, some suboptimal algorithms have then been proposed to simplify the search of the desired OFDM signal with PAPR reduction performance close to optimum, such as an iterative flipping algorithm and an iterative neighborhood searching method. In the iterative flipping algorithm, assume binary random rotation sequence is applied, i.e., $p_i=+1$ or $-1$. As a first step, assume that $p_i=1$ for all and compute the PAPR of the combined signal. Next, invert the first phase factor $p_1=-1$ and recompute the resulting PAPR. If the new PAPR is lower than in the previous step, retain as part of the final phase sequence; otherwise, revert to its previous value. The algorithm continues in this fashion until all K possibilities for "flipping" the signs have been explored. The iterative neighborhood searching method starts with a pre-determined vector of phase factors. Next, it finds an updated vector of phase factors in its "neighborhood" that results in the largest reduction in PAPR. Neighborhood of radius is defined as the set of vectors with Hamming distance equal to or less than from its origin. The equation that updates the vector of phase factors from P to P' is given by $$P' = \arg\max_{\|P-P'\|_H < r} (PAPR \text{ for } P - PAPR \text{ for } P)$$

where $\|*\|_H$ denotes the Hamming weight of its vector argument and r denotes the radius of the neighborhood which is centered at P. This process is repeated using the updated vector of phase factors as a new starting point as long as PAPR reduction is achieved.

However, those suboptimal methods for conventional SLM are not typically applicable to the encoding aided SLM scheme. Therefore, a small set of candidate sequence, i.e., a small Q, and consequently, a small number of candidate sequences are chosen. The PAPR reduction performance is then limited by a small U. A clipping method using a soft amplitude limiter (SAL) has been included to complement and further suppress the PAPR. However, there is some performance loss at the receiver caused by clipping distortion.

In accordance with an embodiment of the present invention, and as shown in FIG. 1, a PAPR threshold $Y_0$ is set at the selector. The selector sequentially evaluates the PAPR for the different OFDM signal obtained by enumerating the label bits. Once the selector finds an OFDM sequence with the PAPR being equal to or smaller than the threshold $Y_0$, the selector stops measuring the PAPR from the rest of the sequences and transmits the current one immediately.

The selection may be taken from u sequences, where $0 \leq u \leq U$. The CCDF of PAPR for the selected OFDM signal can then be written as $$g_u(Y) \underline{\Delta} Pr(PAPR_{SLM}(u) > Y) = (1 - F(Y))^u, \quad (12)$$

where F(Y) is from equation (7) for Nyquist-rate sampled signals and from equations (9) and (10) for oversampled signals.

The probability of the uth sequence being selected for a threshold $Y_0$ is then given by:

$$\begin{aligned} P(u \mid Y_0) &= Pr(PAPR_{SLM}(u) < Y_0, PAPR_{SLM}(u-1) > Y_0) \quad (13) \\ &= Pr(PAPR_{SLM}(u) < Y_0 \mid PAPR_{SLM}(u-1) > Y_0) \\ &\quad Pr(PAPR_{SLM}(u-1) > Y_0) \\ &= Pr(PAPR_{SLM}(1) < Y_0) Pr(PAPR_{SLM}(u-1) > Y_0) \\ &= F(Y)(1 - F(Y_0))^{u-1} = (1 - g_1(Y_0)) g_{u-1}(Y_0). \end{aligned}$$

Obviously, $P(u|Y_0)$ is the probability mass function (PMF) of u conditioned on the threshold $Y_0$. Since $1-F(Y_0)<1$, the probability of finding a desired ($PAPR<Y_0$) sequence at the uth selection decreases exponentially. Thus, if a reasonable threshold is chosen ($Y_0$ is not too small), with high probability, $PAPR<Y_0$ can be achieved with a lower mapping sequence than a maximum U. If the threshold is not well chosen, the target u will be very large. Hence, there is typically a tradeoff between the threshold (consequently the PAPR reduction performance) and the complexity.

Given $u_0$, the probability of finding the sequence with $PAPR<Y_0$ from u sequences, $u \leq u_0$, the cumulative mass function (CMF) $F(u_0|Y)$, is given by $$F(u_0 | Y_0) \underline{\Delta} Pr(u \leq u_0 | PAPR_{SLM}(u) \leq Y_0) = \quad (14)$$
$$\sum_{u=1}^{u_0} P(u \mid Y_0) = 1 - (1 - F(Y_0))^{u_0}.$$

Figure 4:
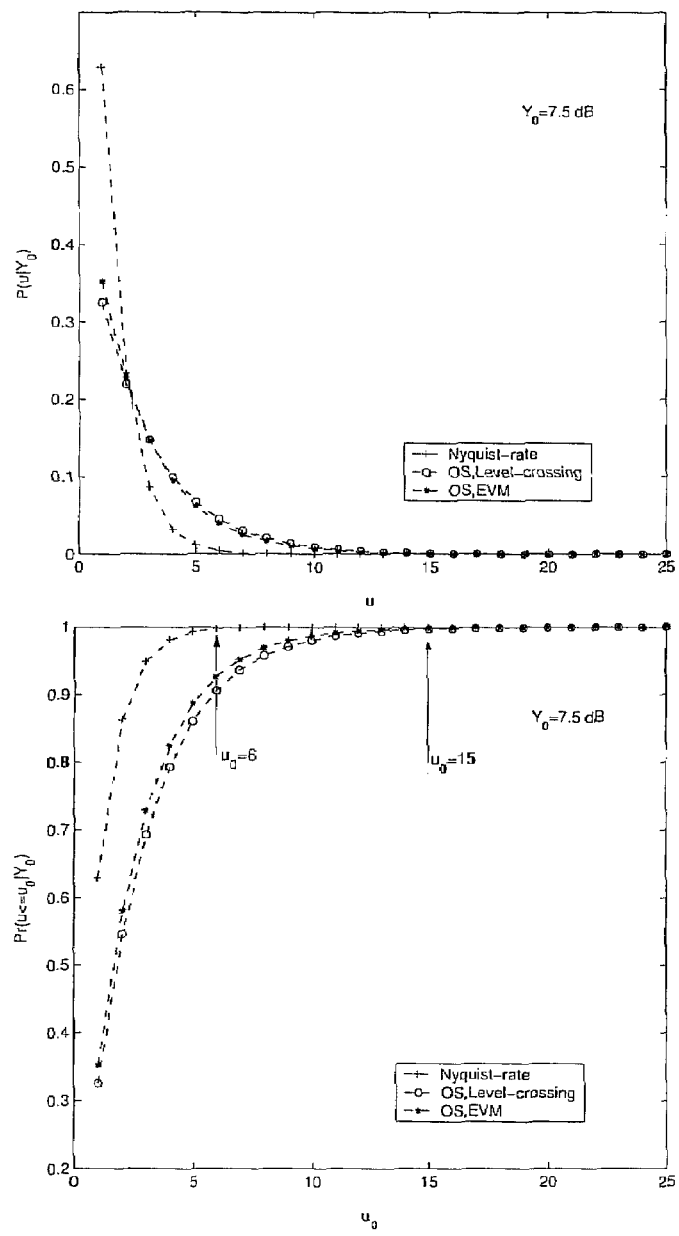
FIG. 4 is a graphical representation of a probability mass function (PMF) and cumulative mass function (CMF) of u sequences for a given threshold $Y_0$ in accordance with an embodiment of the present invention.

FIG. 4 shows a graphical representation 400 of an embodiment of the PMF (upper plot) and CMF (lower plot) curves for a given threshold $Y_0$, $Y_0=7.5$ dB, K=128. Three different methods for estimating the PAPR of the OFDM signal are treated. It is seen that the results from the LC and EVT methods are close to each other. Both have the probability about 0.35 for u=1, 0.23 for u=2, and both have a probability of approximately one to find a sequence satisfying $PAPR<Y_0$ when $u_0=15$. The one from the Nyquist-rate sample signals is different from the other two. It has probability about 0.62 for u=1 and 0.22 for u=2. From the CMF plot, when $u_2=6$, the probability to find the desired sequence is approximately one.

Figure 5:
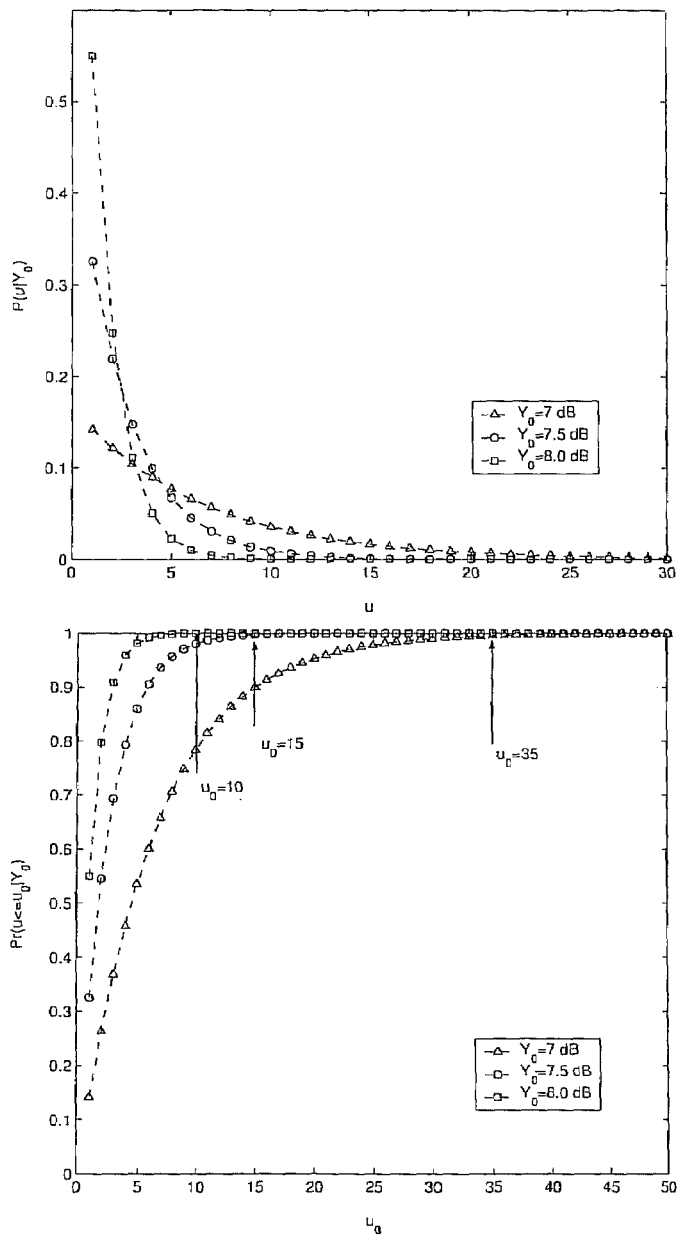
FIG. 5 is a graphical representation of the PMF and CMF of u sequences for different threshold settings in accordance with an embodiment of the present invention.

FIG. 5 shows a graphical representation 500 of the PMF and CMF of u for different threshold settings, namely, $Y_0=7.0$ dB, 7.5 dB, and 8.0 dB. Since the PAPR estimation with oversampling is close to the practical results, the LC method is used to estimate PAPR of OFDM signals (with K=128). It is seen that the probabilities of u=1 are 0.14, 0.32, and 0.53 for $Y_0=7.0$, 7.5, and 8.0 dB, respectively. The values of $u_0$ to achieve a probability of approximately 1 are 35, 15, and 10, respectively. These results show that it is possible to achieve the threshold $Y_0$ with a much smaller number of sequences for selection.

In order to find a reasonable threshold, the average number of u as a function of threshold is determined. Given the threshold $Y_0$, assuming there is no limitation on u, the average of u to achieve PAPR<$Y_0$ is given by $$\bar{u}(Y_0) = \sum_u u P(u \mid Y_0) = \sum_{u=1}^{\infty} u(1-F(Y_0))^{u-1} F(Y_0) = \frac{1}{F(Y_0)} \quad (15)$$

Submitting the approximated F(Y) from the level crossing method produces the following:

$$\bar{u}(Y_0) \cong \exp\left[K\sqrt{\frac{\pi}{3}Y_0}\,e^{-Y_0}\right]. \quad (16)$$

In practice, there is a limitation on u with a maximum U. It is possible that the selector could fail to find a sequence with the PAPR smaller than the threshold $Y_0$. When this happens, the sequence with minimum PAPR is then transmitted. The probability of failure to reach the threshold $Y_0$ within maximum U sequences is given by: $g_U(Y_0)$.

Conditioned on the success of selection within U sequences, $PAPR_{SLM}(U) < Y_0$, the PMF of u for a given $Y_0$, denoted by $P(u|Y_0,U)$, is given by $$P(u \mid Y_0, U) = \frac{(1-F(Y_0))^{u-1} F(Y_0)}{1-(1-F(Y_0))^U} \quad (17)$$

The average u is then given by $$\bar{u}(Y_0 \mid U) = Pr(PAPR_{SLM}(U) < Y_0) \cdot \sum_{u=1}^{U} u P(u \mid Y_0, U) + \quad (18)$$
$$U Pr(PAPR_{SLM}(U) > Y_0)$$
$$= \frac{1}{F(Y_0)}(1-(1-F(Y_0))^U(1+UF(Y_0))) + U(1-F(Y_0))^U$$
$$= \frac{1}{F(Y_0)}\left(1 - \underbrace{(1-F(Y_0))^U}_{\in(Y_0,U)}\right)$$
$$\cong \exp\left[K\sqrt{\frac{\pi}{3}Y_0}\,e^{-Y_0}\right](1-\varepsilon(Y_0,U)).$$

Figure 6:
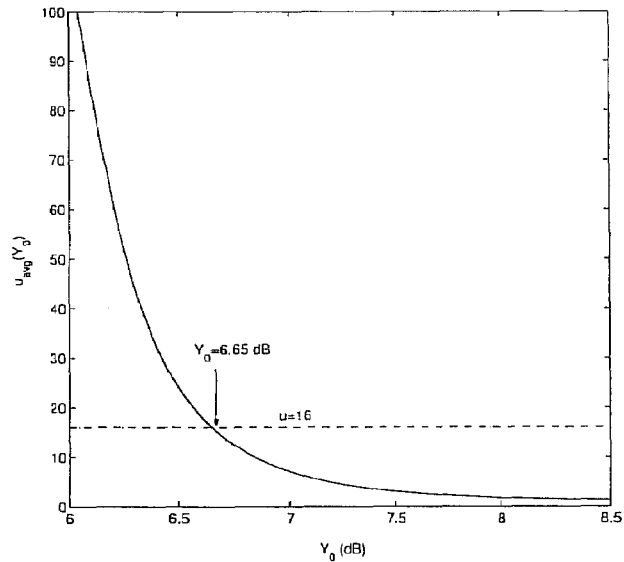
FIG. 6 is a graphical representation of the average u sequences to find the final transmitted OFDM sequence as a function of the threshold $Y_0$ in accordance with an embodiment of the present invention.

FIG. 6 shows a graphical representation 600 of the average u to find the final transmitted OFDM sequence as a function of the threshold $Y_0$. Consider K=128 and U=256. The difference between the unlimited case in equation (16) and the one with a limited U is marginal. It is seen that the average of u is a decreasing function of $Y_0$. For the threshold $Y_0=6.65$ dB, the resulting average $\bar{u}=16$, indicated with an average $\bar{u}=16$ sequences, which has substantially the same complexity as in the previously proposed method for Q=4. As seen in FIG. 3, with U=16, the resulting PAPR performance is 7.7 dB at Pr(PAPR>Y)=$10^{-4}$. A 1 dB gain is then achieved with the same complexity. The $\bar{u}$ is small when the threshold $Y_0>6.5$ dB. When $Y_0=6.5$ dB, however, the average number of u required to satisfy the threshold constraint increases significantly when $Y_0$ decreases. Therefore, a reasonable threshold can be set to balance the complexity and performance based on the curve of $\bar{u}$.

The PAPR performance from the threshold limited selection can then be determined. For a given $Y_0$, when $Y<Y_0$, the CCDF of PAPR performance, $Pr(PAPR_{Th}>Y)$, is given by $$Pr(PAPR_{Th} > Y) = \sum_{u=1}^{\infty} Pr(PAPR > Y \mid PAPR < Y_0) P(u \mid Y_0) \quad (19)$$
$$= \sum_{u=1}^{\infty} \frac{Pr(PAPR > Y, PAPR < Y_0)}{Pr(PAPR < Y_0)} P(u \mid Y_0)$$
$$= \frac{F(Y_0) - F(Y)}{F(Y_0)}$$

The performance for the unlimited u is then summarized as follows $$Pr(PAPR_{Th} > Y) = \begin{cases} 1 - \dfrac{F(Y)}{F(Y_0)}, & Y < Y_0, \\ 0, & Y > Y_0. \end{cases} \quad (20)$$

For a fixed maximal number U, when $Y<Y_0$:

$$Pr(PAPR_{Th} > Y) = Pr(PAPR_{SLM}(U) < Y) \quad (21)$$
$$\sum_{u=1}^{U} \frac{Pr(PAPR > Y, PAPR < Y_0)}{Pr(PAPR < Y_0)} P(u \mid Y_0, U) +$$
$$1 \cdot Pr(PAPR_{SLM}(U) > Y)$$
$$= \sum_{u=1}^{U} \frac{F(Y_0) - F(Y)}{F(Y_0)}(1-F(Y_0))^{u-1} F(Y_0) +$$
$$(1-F(Y_0))^U$$
$$= 1 - \frac{F(Y)}{F(Y_0)} - \frac{F(Y)}{F(Y_0)}(1-F(Y_0))^U.)$$

Therefore, the PAPR performance for finite u<U can then be summarized as follows $$Pr(PAPR_{Th} > Y) = \begin{cases} 1 - \dfrac{F(Y)}{F(Y_0)} - \in_1(Y, Y_0, U), & Y < Y_0, \\ (1-F(Y))^U, & Y \geq Y_0, \end{cases} \quad (22)$$

where $$\in_1(Y, Y_0, U) = \frac{F(Y)}{F(Y_0)}(1-F(Y_0))^U \quad (23)$$

Figure 7:
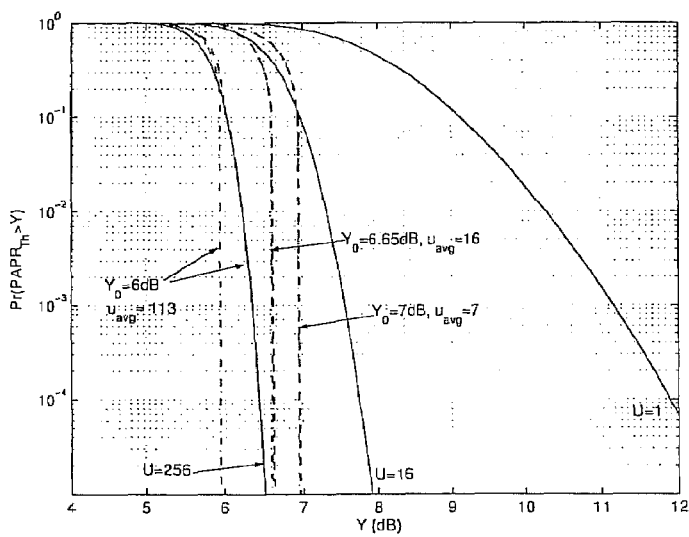
FIG. 7 is a graphical representation of PAPR suppression results of threshold limited selection in accordance with an embodiment of the present invention.

FIG. 7 illustrates the PAPR suppression results 700 of threshold limited selection from the above analysis for K=128. The original PAPR result (U=1) and the PAPR reduction performance from conventional SLM with U=16 and U=256 are also shown. The results for both cases of unlimited and limited u are included. Predictably, a sharp change is at the threshold value in the PAPR performance curves. With a maximum U, the resulting performance follows the conventional SLM resulting curve when $Y>Y_0$. The average is for $Y_0$=7, 6.65, and 6. dB are 7, 16, and 113 respectively. Compared with the performance results from the conventional SLM of U=16, the PAPR reduction performance is improved by 0.7 dB, 1.05 dB, and 1.2 dB at Pr(PAPR>Y)=$10^{-4}$, respectively. Compared with the SLM of U=256, the threshold limited selection offers similar or a little less PAPR reduction performance, but the complexity is significantly reduced.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for reducing peak-to-average power ratio (PAPR) of a coded orthogonal frequency-division multiplexing (OFDM) system comprising:
    modulating label-inserted, coded bits into symbols;
    applying an inverse discrete fourier transform (IDFT) on said symbols to produce OFDM signals having different PAPRs due to insertion of sequences of label bits into a stream of information bits, wherein each OFDM signal corresponds to a different sequence of label bits;
    selecting a threshold PAPR by considering the average number (u) of said sequences and corresponding OFDM signals evaluated for PAPR measurements before finding an OFDM signal with a PAPR that is less than said threshold PAPR; and
    transmitting one of the OFDM signals to a receiver if a PAPR of said one of the OFDM signals is less than the threshold PAPR.

2. The method of claim 1, further comprising:
    mixing the information bits with corresponding label bits into an encoder to generate said label-inserted, coded bits.

3. The method of claim 2, further comprising:
    encoding said information bits with corresponding label bits with random-like codes to produce said label-inserted, coded bits.

4. The method of claim 3, wherein said sequences of label bits are placed at least one of randomly or together at the beginning of said information bits.

5. The method of claim 1, wherein side information is not transmitted with said OFDM signal.

6. The method of claim 1, wherein said modulating further comprises performing quadrature amplitude modulation.

7. The method of claim 2, further comprising:
    mixing said information bits and parity bits randomly.

8. The method of claim 1, further comprising:
    determining u, wherein the selecting further comprises employing a function relating u to said threshold PAPR.

9. The method of claim 8, wherein the function is: u $$u \cong \exp\left[K\sqrt{\frac{\pi}{3}Y_0}\ e^{-Y_0}\right](1 - \varepsilon(Y_0, U))$$

where U is a total number of candidate sequences for a number of label bits, $Y_0$ is said threshold PARP, K is a number of sub-carriers used to transmit said symbols, and $\varepsilon$ is a constant.

10. An orthogonal frequency-division multiplexing (OFDM) system comprising:
    a modulator configured to modulate label-inserted, coded bits into symbols;
    an inverse discrete fourier transform (IDFT) module configured to perform an IDFT on said symbols to produce OFDM signals having different peak-to-average power ratios due to insertion of sequences of label bits into a stream of information bits, wherein each OFDM signal corresponds to a different sequence of label bits;
    an adapting device configured to select a threshold peak-to-average power ratio (PAPR) by considering the average number (u) of said sequences and corresponding OFDM signals evaluated for PAPR measurements before finding an OFDM signal with a PAPR that is less than said threshold PAPR; and
    a selector configured to transmit one of the OFDM signals to a receiver if a PAPR of said one of the OFDM signals is less than the threshold PAPR.

11. The OFDM system of claim 10, further comprising:
    a label inserter configured to mix information bits with corresponding label bits.

12. The OFDM system of claim 11, further comprising:
    an encoder configured to encode said information bits with corresponding label bits with random-like codes to produce said label-inserted, coded bits.

13. The OFDM system of claim 11, wherein said OFDM signal does not include side information.

14. The OFDM system of claim 10, wherein said modulating further comprises performing quadrature amplitude modulation.

15. The OFDM system of claim 12, wherein said encoder further comprises an low-density parity check (LDPC) generator matrix.

16. An orthogonal frequency-division multiplexing (OFDM) system comprising:
    means for modulating label-inserted, coded bits into symbols;
    means for applying an inverse discrete fourier transform (IDFT) on said symbols to produce OFDM signals having different peak-to-average power ratios due to insertion of sequences of label bits into a stream of information bits, wherein each OFDM signal corresponds to a different sequence of label bits;
    means for selecting a threshold peak-to-average power ratio (PAPR) by considering the average number (u) of said sequences and corresponding OFDM signals evaluated for PAPR measurements before finding an OFDM signal with a PAPR that is less than said threshold PAPR; and
    means for transmitting one of the OFDM signals to a receiver if a PAPR of said one of the OFDM signals is less than the threshold PAPR.

17. The OFDM system of claim 16, further comprising:
    means for mixing information bits with corresponding label bits into an encoder to generate said label-inserted, coded bits.

18. The OFDM system of claim 17, further comprising:

means for encoding said information bits with corresponding label bits with random-like codes to produce said label-inserted, coded bits.

19. The OFDM system of claim 16, wherein said means for modulating further comprises means for performing quadrature amplitude modulation.

20. The OFDM system of claim 17, further comprising:

means for mixing said information bits and parity bits randomly.

21. The OFDM system of claim 16, further comprising:

means for determining u, wherein said selecting further comprises employing a function relating u to said threshold PAPR.

\* \* \* \* \*